(12) United States Patent
Oku (10) Patent No.: US 8,319,981 B2
(45) Date of Patent: Nov. 27, 2012

(54) IMAGE FORMING APPARATUS AND DATA SAVING METHOD FOR AN IMAGE FORMING APPARATUS

(75) Inventor: Toyoaki Oku, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 980 days.

(21) Appl. No.: 12/349,775

(22) Filed: Jan. 7, 2009

(65) Prior Publication Data

US 2009/0237711 A1 Sep. 24, 2009

(30) Foreign Application Priority Data

Mar. 19, 2008 (JP) ................. 2008-071849

(51) Int. Cl.
*G06F 3/12* (2006.01)
*G06K 15/00* (2006.01)
(52) U.S. Cl. .................... 358/1.13; 358/1.14
(58) Field of Classification Search .......... 358/1.13, 358/1.14, 1.15, 402, 405, 407, 434, 440, 358/444, 468; 709/218, 229; 707/104.1
See application file for complete search history.

(56) References Cited

U.S. PATENT DOCUMENTS

| | | | |
|---|---|---|---|
| 7,069,444 B2 * | 6/2006 | Lowensohn et al. | 713/185 |
| 8,068,241 B2 * | 11/2011 | Yoshii et al. | 358/1.13 |
| 2007/0203946 A1 * | 8/2007 | Maeshima et al. | 707/104.1 |
| 2011/0080612 A1 * | 4/2011 | Park et al. | 358/1.15 |

FOREIGN PATENT DOCUMENTS

| | | |
|---|---|---|
| JP | 2002-011921 | 1/2002 |
| JP | 2002-202870 | 7/2002 |
| JP | 2006-074093 | 3/2006 |

OTHER PUBLICATIONS

Japanese Office Action 2008-071849 dated Jul. 31, 2012, 4 pages.

* cited by examiner

*Primary Examiner* — Jerome Grant, II
(74) *Attorney, Agent, or Firm* — K&L Gates LLP (57) ABSTRACT

An image forming apparatus comprising: a storage unit for saving administrator data and user data therein; and a user data setting unit for saving a portion of the user data that is different from the administrator data, as the user data in the storage unit.

7 Claims, 6 Drawing Sheets

IMAGE FORMING APPARATUS AND DATA SAVING METHOD FOR AN IMAGE FORMING APPARATUS

INCORPORATION BY REFERENCE

This application is based upon and claims the benefit of priority from the corresponding Japanese Patent Application No. 2008-071849, filed Mar. 19, 2008, the entire contents of which is incorporated herein by reference.

BACKGROUND

1. Field of the Invention

The present invention relates to image forming apparatuses and data saving methods for an image forming apparatus. More particularly, the present invention relates to an image forming apparatus and a data saving method for an image forming apparatus which allow set data to be saved efficiently in the image forming apparatus.

2. Description of the Related Art

In recent years, image forming apparatuses including printers, multifunction peripherals (MFP), and digital multifunction machines are becoming widespread in office settings.

These image forming apparatuses increasingly have increased supporting functions and higher functions. Various settings can be performed on the image forming apparatus, and hence a large number of different settings may be performed by each user. Therefore, a setting data saving area is provided for saving data on settings performed by an administrator of an image forming apparatus (hereinafter, referred to as "administrator setting data") and data on settings performed by users on a user basis (hereinafter, referred to as "user setting data").

SUMMARY

The present invention provides image forming apparatuses comprising: a storage unit for saving administrator data and user data therein; and a user data setting unit for saving at least a portion of the user data that is different from the administrator data, as the user data in the storage unit. Additionally, methods are provided for using image forming apparatuses as well as systems involving same.

Additional features and advantages are described herein, and will be apparent from the following Detailed Description and the figures.

DETAILED DESCRIPTION (Functional Configuration of an Image Forming Apparatus)

Figure 1:
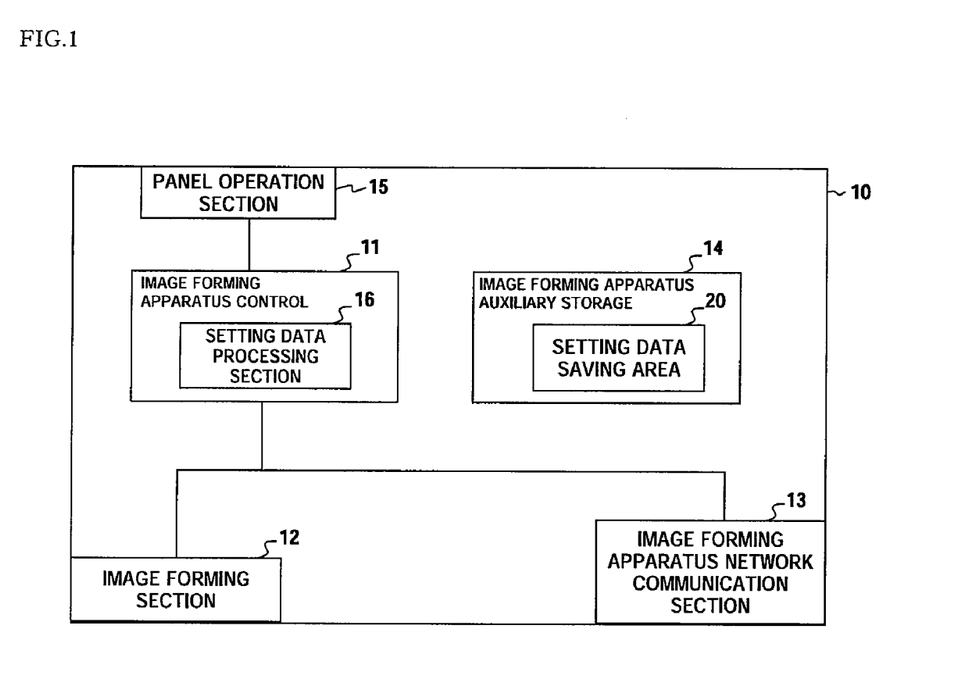
FIG. 1 is a diagram illustrating a functional configuration of an image forming apparatus according to an embodiment of the present invention.

Referring to FIG. 1, a functional configuration of an image forming apparatus 10 according to an embodiment of the present invention is described.

The image forming apparatus 10 includes functional components such as an image forming apparatus control section 11, an image forming section 12, an image forming apparatus network communication section 13, an image forming apparatus auxiliary storage section 14, and a panel operation section 15. The image forming apparatus control section 11 includes a setting data processing section 16 (corresponding to a user data setting unit, a setting data replacement unit, an administrator data setting unit, and a setting data table creation unit). The image forming apparatus auxiliary storage section 14 includes a setting data saving area 20 (corresponding to a storage unit). In this configuration, the image forming apparatus control section 11, the image forming section 12, the image forming apparatus network communication section 13, and the image forming apparatus auxiliary storage section 14 are connected via a bus or by other means.

The image forming apparatus control section 11 includes a main storage unit such as a random access memory (RAM) or a read-only memory (ROM) and a control unit such as a micro processing unit (MPU) or a central processing unit (CPU). The image forming apparatus control section 11 is designed for controlling the image forming apparatus 10 and thereby includes various I/Os, an interface such as a universal serial bus (USB), and a bus controller.

The image forming section 12 is a component for converting an original, for which a user has made a conversion request, into a printable image.

The image forming apparatus network communication section 13 includes a detachably-attachable local area network (LAN) interface for allowing connection to a network. The LAN interface includes a network section for performing intelligent transmission/reception via various network protocols such as TCP/IP, AppleTalk, and SMB.

The image forming apparatus auxiliary storage section 14 represents an auxiliary storage device which can be a flash memory or the like. The storage section 14 saves data that is used in a process executed by the image forming apparatus control section 11.

The panel operation section 15 displays: the printable image on a panel in response to a request made by the image forming apparatus control section 11; and operation items for functions provided to the image forming apparatus 10 and administrator setting data or user setting data, receiving an input thereof. Further, it detects whether or not the user has touched the panel. In addition, the panel operation section 15 includes a register for temporarily saving data inputted by the user.

Installed in the setting data processing section 16 are a setting data saving processing program and a setting data replacement processing program. In the setting data saving processing program, the user setting data is created based on the administrator setting data saved in the setting data saving area 20, and is saved into the setting data saving area 20. In the setting data replacement processing program, the administrator setting data and the user setting data are extracted from the setting data saving area 20, and setting values can be set in the image forming apparatus 10.

Figure 2:
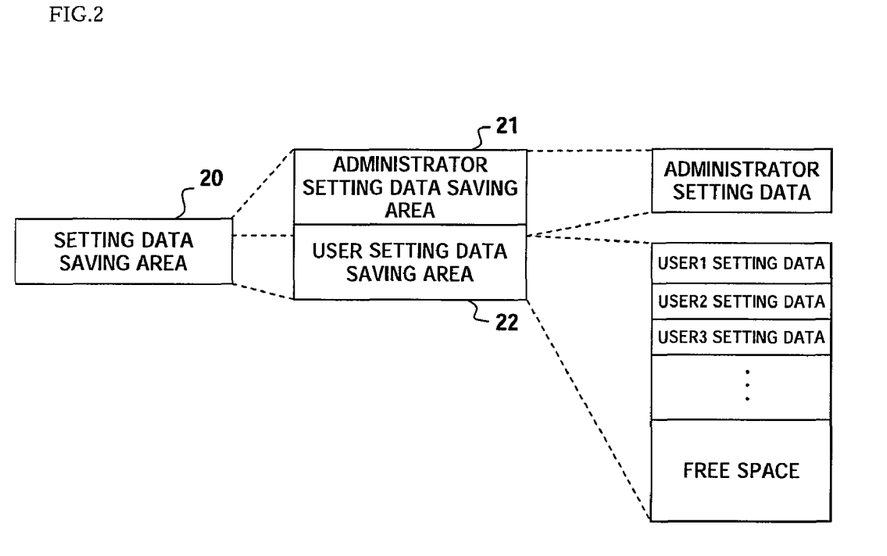
FIG. 2 is a diagram illustrating structures of data within a setting data saving area according to the embodiment of the present invention.

The setting data saving area 20 provides an area for saving the administrator setting data and the user setting data therein; the data being saved in the image forming apparatus auxiliary storage section 14. Referring now to FIG. 2, the structure of data within the setting data saving area 20 is described. The setting data saving area 20 comprises an administrator setting data saving area 21 and a user setting data saving area 22. The administrator setting data is saved in the administrator setting data saving area 21. The user setting data, set by the plurality of users who use the image forming apparatus 10, is saved in the user setting data saving area 22. For the data structure of the administrator setting data shown in FIG. 2, reference is made to the structure of the administrator setting data of FIG. 3A which is described later. Also, for the data structure of the user setting data shown in FIG. 2, reference is made to the structure of the user setting data of FIG. 3C which is described later.

Figure 3:
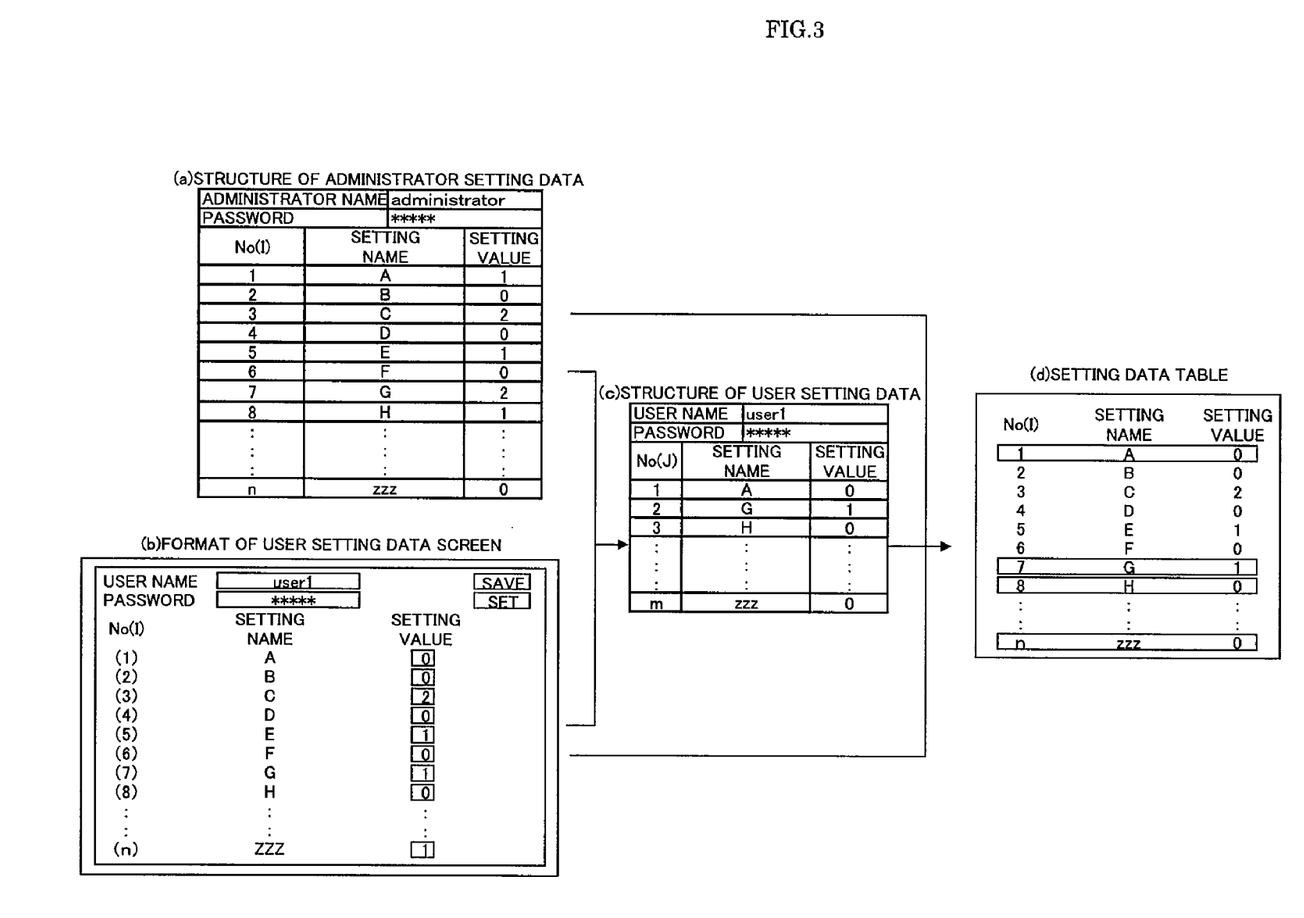
FIGS. 3A to 3D are diagrams illustrating relationships among setting data according to the embodiment of the present invention.
Figure 4:
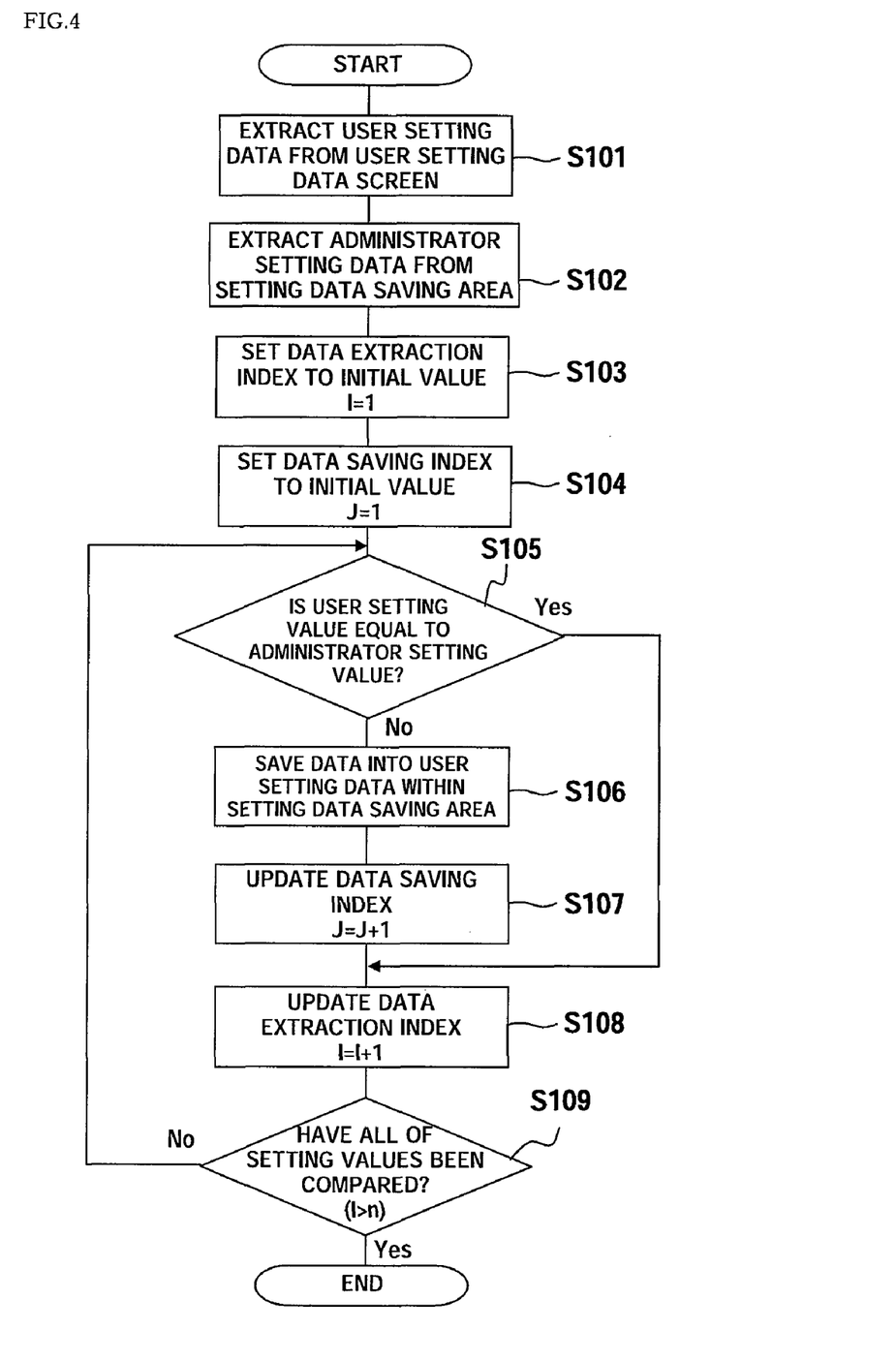
FIG. 4 is a flowchart illustrating a flow of a setting data saving processing according to the embodiment of the present invention.

Referring now to FIGS. 3 and 4, the structure of the administrator setting data is set forth in FIG. 3A, a format of a user setting data screen is provided in FIG. 3B, the structure of the user setting data is provided in FIG. 3C, and a flowchart showing a flow of a setting data saving processing is provided in FIG. 4. This describes the setting data saving process for the image forming apparatus 10 according to an embodiment of the present invention. Data is saved in an area for the administrator setting data of FIG. 3A, and setting data is displayed on the user setting data screen of FIG. 3B. The user setting data to be changed is selected by the user through the user setting data screen of FIG. 3B and then set. When a saving request is made, the setting data processing section 16 starts the setting data saving process illustrated in FIG. 4 and the user setting data of FIG. 3C is saved. Hereinafter, with reference to FIGS. 3A to 3C and 4, the process will be described in more detail.

FIG. 3A shows the format of the administrator setting data. There is provided space for an administrator name and a password of the administrator; as illustrated an administrator name "administrator" and the password "*****", respectively, were inputted when the administrator performed administrator settings for the image forming apparatus 10. Also provided for a setting name and a setting value of the administrator setting data are setting names and setting values, respectively, which were inputted when the administrator performed the administrator settings, the setting names being assigned Nos. 1, 2, 3, . . . , and n in order. For example, in the administrator setting data of FIG. 3A, "A" and "1" are saved as the setting name and the setting value, respectively, which correspond to No. (I)=1.

FIG. 3B shows the format of the user setting data screen for allowing the user to save or set the user setting data through the panel operation section 15. On the user setting data screen of FIG. 3B, input fields for a user name and a password are displayed, and the user name "user1" and the password "*****", respectively, inputted by the user are displayed. Also displayed for a setting name and a setting value on the user setting data screen are setting names and setting values obtained when the user performed user settings corresponding to the setting names, respectively, the setting names being assigned Nos. (I)=1, 2, 3, . . . , and n in order. For example, on the user setting data screen of FIG. 3B, "A" and "0" are displayed as the setting name and the setting value, respectively, which correspond to No. (I)=1. Also displayed on the user setting data screen of FIG. 3B are a "save" button and a "set" button. The user inputs the user name, the password, and the setting values through the user setting data screen and depresses the "save" button. The setting data saving processing program corresponding to the setting data saving processing is then performed by the setting data processing section 16 and the user setting data is saved. Further, when the user inputs the user name and the password through the user setting data screen and depresses the "set" button, the setting data replacement processing program corresponding to the setting data replacement processing performed by the setting data processing section 16 is executed and the user setting data of the corresponding user is set in the image forming apparatus 10.

FIG. 3C shows the format of the user setting data. Provided for a user name and a password of the user setting data are the user name and the password to be inputted by the user through the user setting data screen. Saved in the user setting data of FIG. 3C are the user name "user1" and the password "*****", respectively. Also provided for a setting name and a setting value of the user setting data are the setting names displayed on the user setting data screen and the setting values input by the user through the user setting data screen, respectively, the setting names being assigned No. (J)=1, 2, 3, . . . , and m in order. For example, in the user setting data of FIG. 3C, "A" and "0" are saved as the setting name and the setting value, respectively, which correspond to No. (J)=1. The user setting data of FIG. 3C is set in such a manner that only items set by the user changing the administrator setting data are saved therein.

FIG. 4 is a flowchart illustrating schematically the setting data saving processing. The setting data saving processing is described based on a sequence of steps shown in the flowchart of FIG. 4.

The user inputs the user name, the password, and the setting value corresponding to the setting name through the user setting data screen shown in FIG. 3B and depresses the "save" button. The panel operation section 15 then outputs a user saving request to the image forming apparatus control section 11. The image forming apparatus control section 11 notifies the setting data processing section 16 (corresponding to the user data setting unit) of the user saving request. When the setting data processing section 16 is notified of the user saving request, the setting data saving process is executed by the setting data processing section 16 as the user data setting unit.

(Step S101)

When the setting data saving process is started, the setting data processing section 16 extracts the user setting data inputted through the user setting data screen from the register of the panel operation section 15, and advances to Step S102.

(Step S102)

The setting data processing section 16 extracts the administrator setting data from the administrator setting data saving area 21 of the setting data saving area 20, and advances to Step S103.

(Step S103)

The setting data processing section 16 sets the data extraction index (I) to the initial value "1", and advances to Step S104.

(Step S104)

The setting data processing section 16 sets the data saving index (J) to the initial value "1", and advances to Step S105.

(Step S105)

The setting data processing section 16 extracts the setting value corresponding to No. (I) on the user setting data screen and the setting value corresponding to No. (I) of the administrator setting data. Then it checks to determine whether or not the setting values are equal to each other. If the setting value on the user setting data screen and the setting value of the administrator setting data are equal to each other, the setting data processing section 16 does not need to save the setting value into the user setting data, and therefore advances to Step S108 of updating the data extraction index (I). For example, if the setting value for the setting name "B" corresponding to No. (I)=2 of the administrator setting data shown in FIG. 3A is set to "0", and if the setting value for the setting name "B" on the user setting data screen shown in FIG. 3B is set to "0", the setting values for the setting name "B" of the administrator setting data and on the user setting data screen are the same. In such a case, the setting value for the setting name "B" is not saved into the user setting data. If the setting value on the user setting data screen and the setting value of the administrator setting data are not equal to each other, the setting data processing section 16 advances to Step S106 of saving the setting value on the user setting data screen as the setting value of the user setting data. For example, if the setting value for the setting name "A" corresponding to No. (I)=1 of the administrator setting data shown in FIG. 3A is set to "1", and if the setting value for the setting name "A" corresponding to No. (I)=1 on the user setting data screen shown in FIG. 3B is set to "0", the setting values for the setting name "A" of the administrator setting data and on the user setting data screen are different, and hence the setting value for the setting name "A" on the user setting data screen is saved into the user setting data as the setting value "0" corresponding to No. (J)=1 as shown in FIG. 3C.

(Step S106)

The setting data processing section 16 saves the setting name and the setting value corresponding to No. (I) on the user setting data screen as the setting name and the setting value corresponding to No. (J) of the user setting data, respectively. For example, the setting name "A" and the setting value "0" corresponding to No. (I)=1 on the user setting data screen shown in FIG. 3B are saved as the setting name and the setting value corresponding to No. (J)=1 of the user setting data shown in FIG. 3C, respectively. The setting data processing section 16 then advances to Step S107.

(Step S107)

The setting data processing section 16 adds "1" to the data saving index (J), and advances to Step S108.

(Step S108)

The setting data processing section 16 adds "1" to the data extraction index (I), and advances to Step S109.

(Step S109)

The setting data processing section 16 analyzes the data extraction index (I) with respect to the maximum value (n) of the data extraction index (I) in order to confirm whether or not all of the setting values on the user setting data screen and the administrator setting data have been compared with each other. If the data extraction index (I) is larger than the maximum value (n), the setting data processing section 16 terminates the setting data saving processing. Further, if the data extraction index (I) is equal to or smaller than the maximum value (n), the setting data processing section 16 returns to Step S105 where the next pair of setting values are compared to each other.

Figure 5:
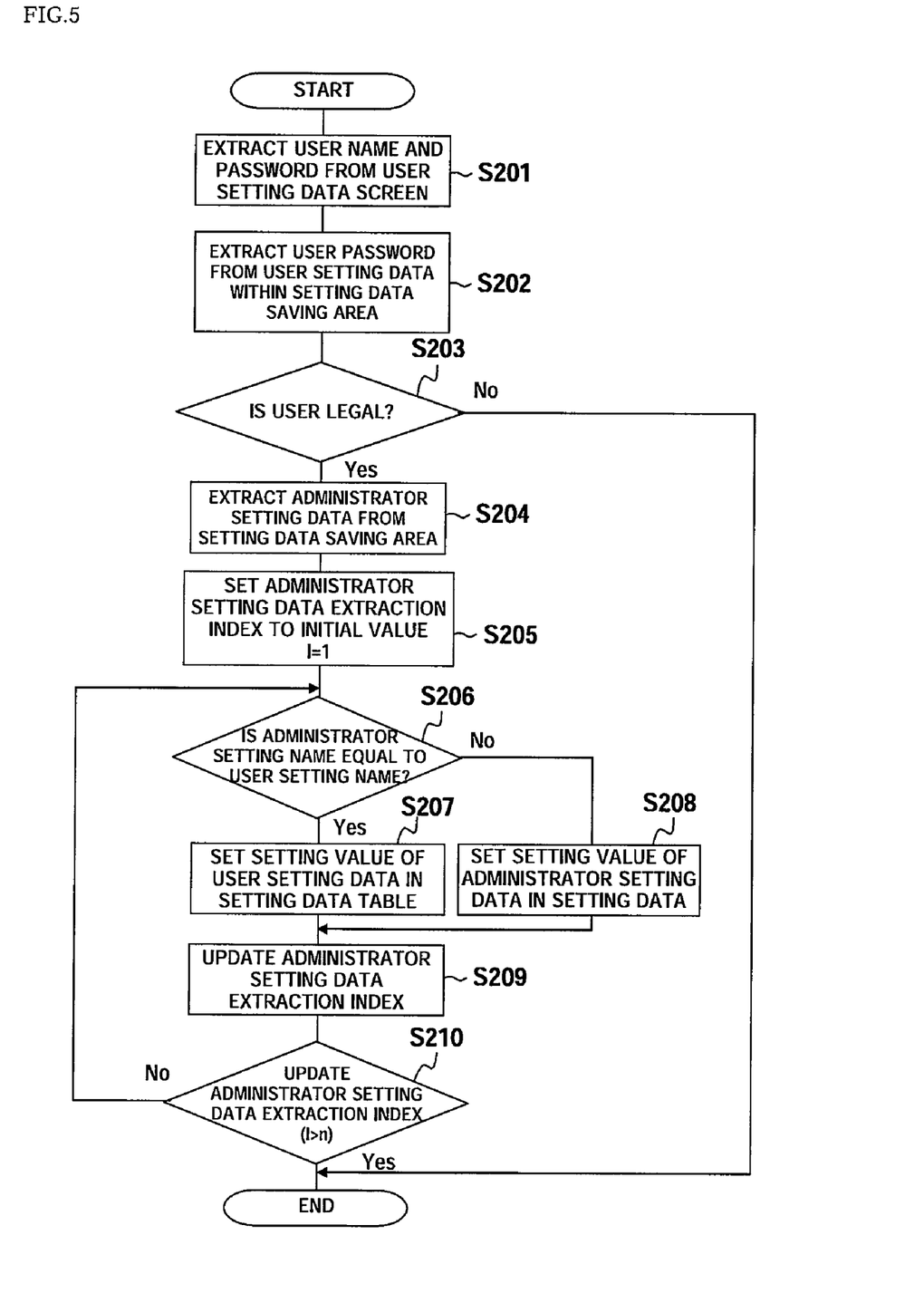
FIG. 5 is a flowchart illustrating a flow of a setting data replacement processing according to the embodiment of the present invention.

Referring to the structure of the administrator setting data of FIG. 3A, the format of the user setting data screen of FIG. 3B, the structure of the user setting data of FIG. 3C, the setting data table of FIG. 3D, and the flowchart of FIG. 5 depicts schematically the setting data replacement process, a description will now be provided of the setting data replacement process performed by the image forming apparatus 10 according to an embodiment of the present invention. In this case, it is assumed that data are previously saved in the administrator setting data of FIG. 3A and the user setting data of FIG. 3C. When a setting request for the user setting data is made through the user setting data screen of FIG. 3B, the setting data replacement process shown in FIG. 5 is initiated, and the user setting data table of FIG. 3D is created. The structure of the administrator setting data of FIG. 3A, the structure of the user setting data of FIG. 3C, and the format of the user setting data screen of FIG. 3B are the same as described heretofore with respect to the setting data saving process.

The user setting data table of FIG. 3D represents a data table that is temporarily saved in the main storage unit of the image forming apparatus control section 11, wherein the setting values to be set in the image forming apparatus 10 are saved. The image forming apparatus control section 11 sets the setting values within the user setting data table of FIG. 3D in the image forming apparatus 10. For example, setting name "A" and setting value "0" are illustrated as with respect to No. (I)=1 of the user setting data table of FIG. 3D.

FIG. 5 is a flowchart illustrating schematically the setting data replacement process. The setting data replacement process is described based on a sequence of steps shown in the flowchart of FIG. 5.

When the user inputs the user name and the password through the user setting data screen shown in FIG. 3B and depresses the "set" button, the panel operation section 15 outputs a user setting request to the image forming apparatus control section 11. The image forming apparatus control section 11 notifies the setting data processing section 16 of the user setting request. The setting data replacement process is then initiated by the setting data processing section 16 as the setting data replacement unit.

(Step S201)

When the setting data replacement process is started, the setting data processing section 16 extracts the user name and the password displayed on the user setting data screen from the register of the panel operation section 15, and advances to Step S202.

(Step S202)

The setting data processing section 16 extracts the password, corresponding to the user name of the user setting data, from the user setting data saving area 22 of the setting data saving area 20, and advances to Step S203.

(Step S203)

The setting data processing section 16 determines whether or not the password inputted through the user setting data screen is the same as the password extracted from the user setting data of the user setting data saving area 22. If the password is the same, the setting data processing section 16 identifies the user as acceptable, and advances to Step S204 wherein the administrator setting data is extracted from the administrator setting data saving area 21 of the setting data saving area 20. If the results are negative, the setting data processing section 16 determines that the user is not acceptable, and terminates the setting data replacement process.

(Step S204)

The setting data processing section 16 extracts the administrator setting data from the administrator setting data saving area 21 of the setting data saving area 20, and advances to Step S205.

(Step S205)

The setting data processing section 16 sets an administrator setting data extraction index (I) to the initial value "1", and then advances to Step S206.

(Step S206)

The setting data processing section 16 extracts the setting name corresponding to No. (I) of the administrator setting data shown in FIG. 3A. Then, the setting data processing section 16 determines whether or not the extracted setting name exists in the setting names of the corresponding user setting data shown in FIG. 3C. If the same setting name exists in the setting names of the corresponding user setting data, the setting data processing section 16 advances to Step S207. If the same setting name does not exist in the setting names of the corresponding user setting data, the setting data processing section 16 advances to Step S208.

(Step S207)

If the same setting name as the setting name set in the administrator setting data shown in FIG. 3A exists in the setting names of the user setting data shown in FIG. 3C, saved by the corresponding user ("Yes" in Step S206), the setting data processing section 16 sets the setting name and the setting value of the user setting data shown in FIG. 3C as the setting name and the setting value corresponding to No. (I) within the user setting data table shown in FIG. 3D, and advances to Step S209. For example, the setting data processing section 16 determines whether or not the setting name "A" corresponding to No. (I)=1 of the administrator setting data shown in FIG. 3A exists in the setting names of the user setting data shown in FIG. 3C. In the example set forth in FIG. 3C, the setting name "A" exists in the setting names of the user setting data, and hence the setting name "A" is saved as the setting name corresponding to No. (I)=1 within the user setting data table shown in FIG. 3D, and the setting value "0" for the setting name "A" of the user setting data is saved as the setting value.

(Step S208)

If the same setting name does not exist in the setting names of the corresponding user setting data ("No" in Step S206), the setting data processing section 16 (setting data table creation unit) sets the setting name and the setting value corresponding to No. (I) of the administrator setting data shown in FIG. 3A as the setting name and the setting value corresponding to No. (I) within the user setting data table shown in FIG. 3D, and advances to Step S209. For example, the setting data processing section 16 (setting data table creation unit) determines whether or not the setting name "B" corresponding to No. (I)=2 of the administrator setting data shown in FIG. 3A exists in the setting names of the user setting data shown in FIG. 3C. In the example of FIG. 3C, the setting name "B" does not exist in the setting names of the user setting data, and hence the setting name "B" is saved as the setting name within the user setting data table shown in FIG. 3D, and the setting value "0" for the setting name "B" of the administrator setting data is saved as the setting value.

(Step S209)

The setting data processing section 16 adds "1" to the administrator setting data extraction index (I), and advances to Step S210.

(Step S210)

The setting data processing section 16 analyzes the data extraction index (I) in terms of the maximum value (n) of the data extraction index (I) in order to determine whether or not all of the setting names of the administrator setting data exist in the user setting data. If the data extraction index (I) is larger than the maximum value (n), the setting data processing section 16 terminates the setting data replacement processing. Further, if the data extraction index (I) is equal to or smaller than the maximum value (n), the setting data processing section 16 returns to Step S206 so as to retrieve the next setting name.

According to the embodiment described above, it is possible to efficiently save the setting data for the image forming apparatus in the image forming apparatus, and to provide an image forming apparatus and a data saving method for the apparatus wherein the saved setting data is easily extracted and set in the image forming apparatus.

In the configuration of this embodiment, only one administrator setting data is saved in the image forming apparatus, but it should be noted that a plurality of administrator setting data can be saved.

(Another Embodiment)

In the image forming apparatus, there are situations where the administrator setting data cannot be changed by a person other than the administrator by setting the administrator setting data as default values and where the administrator setting data is set as the setting data generally used by a large number of users. In the situation where the administrator setting data cannot be changed by a person other than the administrator by setting the administrator setting data as default values, when the administrator changes the administrator setting data, the setting data processing section automatically performs a review of the user setting data. Where the administrator setting data is set as the setting data generally used by a large number of users, the setting data processing section can save the setting data for the image forming apparatus efficiently into the image forming apparatus by automatically changing the setting value of the administrator setting data based on the setting value of the user setting data. For example, if setting values of a plurality of user setting data are equal to one another, but, different from the setting value of the administrator setting data, the setting value of the administrator setting data is changed. That is, the setting data processing section changes the setting value of the administrator setting data to thereby delete the same setting values from the plurality of user setting data. This allows the setting data for the image forming apparatus to be efficiently saved into the image forming apparatus.

Figure 6:
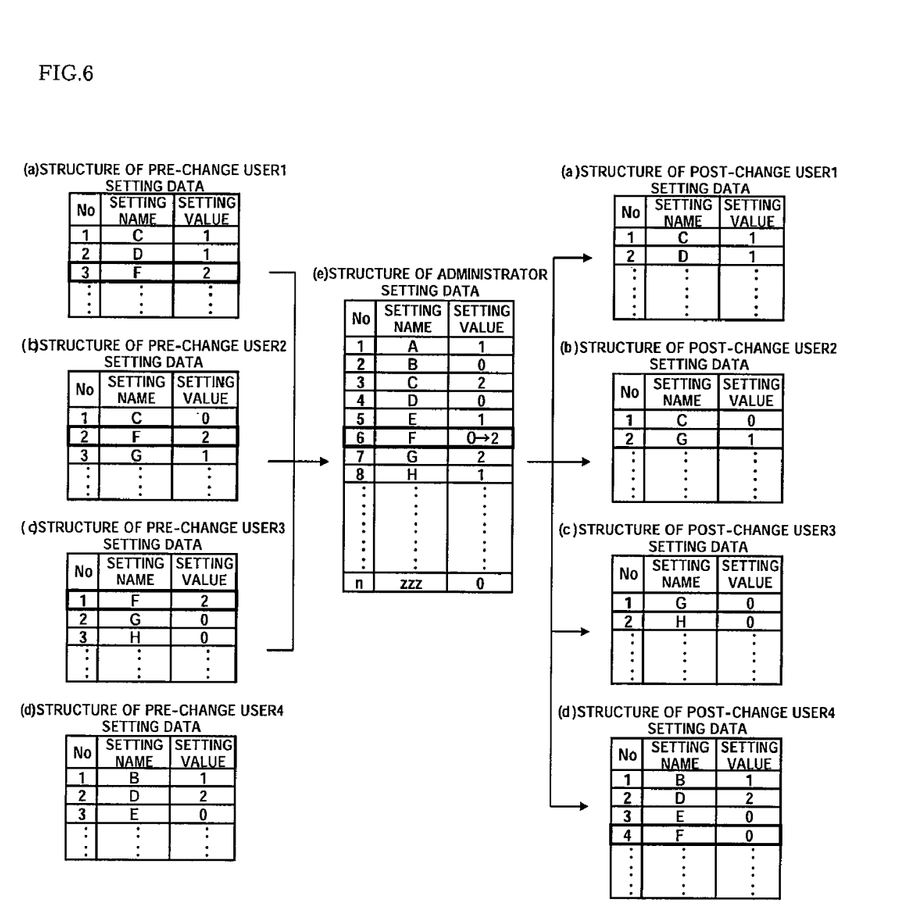
FIGS. 6A to 6E and 6A' to 6D' are diagrams illustrating relationships among setting data according to another embodiment of the present invention.

FIG. 6 describes another embodiment in which the setting value of the administrator setting data is changed based on the setting value of the user setting data. FIG. 6A illustrates a structure of a pre-change user1 setting data, FIG. 6B illustrates a structure of a pre-change user2 setting data, FIG. 6C illustrates a structure of a pre-change user3 setting data, and FIG. 6D illustrates a structure of a pre-change user4 setting data. FIG. 6E illustrates a structure of the administrator setting data. FIG. 6A' illustrates a structure of post-change user1 setting data, FIG. 6B' illustrates a structure of post-change user2 setting data, FIG. 6C' illustrates a structure of post-change user3 setting data, and FIG. 6D' illustrates a structure of post-change user4 setting data.

In the user setting data and the administrator setting data, for example, the setting value for the setting name "F" is set to "2" in the pre-change user1 setting data of FIG. 6A, the pre-change user2 setting data of FIG. 6B, and the pre-change user3 setting data of FIG. 6C. The setting name "F" does not exist in the pre-change user4 setting data of FIG. 6D, which means that the setting value for the setting name "F" of user4 is set to "0" the same as the setting value of the administrator setting data. In such a situation, since three of four user setting data have the same setting value, the setting value for the setting name "F" of the administrator setting data is changed to "2". As a result of the change, the setting name "F" is deleted from the pre-change user1 setting data of FIG. 6A, the pre-change user2 setting data of FIG. 6B, and the pre-change user3 setting data of FIG. 6C, and the setting name "F" and its setting value "0" are added to the pre-change user4 setting data of FIG. 6D. As a result, the pre-change user1 setting data of FIG. 6A becomes the post-change user1 setting data of FIG. 6A', the pre-change user2 setting data of FIG. 6B becomes the post-change user2 setting data of FIG. 6B', the pre-change user3 setting data of FIG. 6C becomes the post-change user3 setting data of FIG. 6C', and the pre-change user4 setting data of FIG. 6D becomes the post-change user4 setting data of FIG. 6D'.

A setting data change process is provided for automatically changing the administrator setting data and the user setting data when the setting values of the user setting data are different from the setting value of the administrator setting data when the number of setting values having the same values among a plurality of items of user setting data, which are included in the above-mentioned setting values of the different user setting data, becomes equal to or larger than a predetermined number. By performing the setting data change processing while the user is not using the image forming apparatus, it is possible to change the user setting data and the administrator setting data. Accordingly, by changing the setting values of the user setting data and the administrator setting data, the same setting values can be deleted from a plurality of user setting data. This provides a data saving method for an image forming apparatus which efficiently saves the setting data in the image forming apparatus.

Although an embodiment of the present invention relates to the setting data for the image forming apparatus, the present invention is not limited to the setting data. For example, the present invention can be implemented with respect to various types of data as can be culled from the data saved in an image forming apparatus, for example, address data within an address book in the administrator data saved by an administrator and user data saved by a user.

Generally, in an embodiment, the present invention is as follows. An image forming apparatus, according to an embodiment of the present invention, comprises: a storage unit for storing administrator data and user data therein; and a user data setting unit for saving at least a portion of the user data that is different from the administrator data, as the user data in the storage unit.

There may be provided a setting data replacement unit for replacing a setting value of the administrator data for a setting name thereof that corresponds to a setting name of the user data, by a setting value of the user data.

The user data setting unit may set a plurality of items of the user data, and save the plurality of items of the user data in the storage unit.

Further, there may be provided an administrator data setting unit for saving a plurality of items of the administrator data as the administrator data.

The administrator data may include administrator setting data to be set in the image forming apparatus, and the user data may include user setting data to be set in the image forming apparatus.

Further, there may be provided a setting data table creation unit capable of referencing both the administrator setting data and the user setting data to set a setting name and a setting value in a setting data table included in the image forming apparatus.

The administrator data setting unit may change the administrator setting data when setting values of the user setting data are different from a setting value of the administrator setting data and when the number of setting values having the same values among a plurality of user setting data, which are included in the setting values of the different user setting data, becomes equal to or larger than a predetermined number.

The user data setting unit may change the user setting data when setting values of the user setting data are different from a setting value of the administrator setting data and when the number of setting values having the same values among a plurality of user setting data, which are included in the setting values of the different user setting data, becomes equal to or larger than a predetermined number.

A data saving method for an image forming apparatus according to an embodiment of the present invention comprises: a storage step of storing administrator data and user data; and a user data setting step of saving a portion of the user data that is different from the administrator data, as the user data in the storage step.

An image forming apparatus, according to another embodiment of the present invention, comprises: means for entering administrator data and user data therein; a storage unit capable of storing the administrator data and user data; and a user data setting unit capable of saving at least a portion of the user data that is different from the administrator data, as the user data in the storage unit.

Although the present invention is preferably implemented as the data saving method for an image forming apparatus, it is not limited to the data saving method for an image forming apparatus.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming apparatus, comprising:
   a storage unit for storing administrator data and user data therein;
   a user data setting unit for saving at least a portion of the user data that is different from the administrator data, as the user data in the storage unit; and
   an administrator data setting unit for saving a plurality of items of the administrator data as the administrator data;
   wherein:
   the administrator data comprises administrator setting data to be set in the image forming apparatus;
   the user data comprises user setting data to be set in the image forming apparatus; and
   the administrator data setting unit changes the administrator setting data when the number of setting values having the same values among a plurality of user setting data becomes equal to or larger than a predetermined number.

2. The image forming apparatus according to claim 1, comprising a setting data replacement unit for replacing a setting value of the administrator data for a setting name thereof that corresponds to a setting name of the user data, by a setting value of the user data.

3. The image forming apparatus according to claim 1, wherein the user data setting unit can set a plurality of items of the user data, and save the plurality of items of the user data in the storage unit.

4. The image forming apparatus according to claim 1, further comprising a setting data table creation unit capable of referencing both the administrator setting data and the user setting data to set a setting name and a setting value in a setting data table stored in the storage unit.

5. The image forming apparatus according to claim 1, wherein the user data setting unit changes the user setting data when the number of setting values having the same values among a plurality of user setting data becomes equal to or larger than a predetermined number.

6. A data saving method for an image forming apparatus, comprising:
   a storage step of storing administrator data and user data;

a user data setting step of saving a portion of the user data that is different from the administrator data, as the user data in the storage step; and an administrator data setting step of saving a plurality of items of the administrator data as the administrator data;

wherein:

the administrator data comprises administrator setting data to be set in the image forming apparatus;

the user data comprises user setting data to be set in the image forming apparatus; and the administrator data setting step changes the administrator setting data when the number of setting values having the same values among a plurality of user setting data becomes equal to or larger than a predetermined number.

7. An image forming apparatus, comprising:

a storage unit for storing administrator data and user data therein;

a user data setting unit for saving at least a portion of the user data that is different from the administrator data, as the user data in the storage unit; and an administrator data setting unit for saving a plurality of items of the administrator data as the administrator data;

wherein:

the administrator data comprises administrator setting data to be set in the image forming apparatus;

the user data comprises user setting data to be set in the image forming apparatus; and the user data setting unit changes the user setting data when the number of setting values having the same values among a plurality of user setting data becomes equal to or larger than a predeteimined number.

* * * * *